Figures 1, 2:
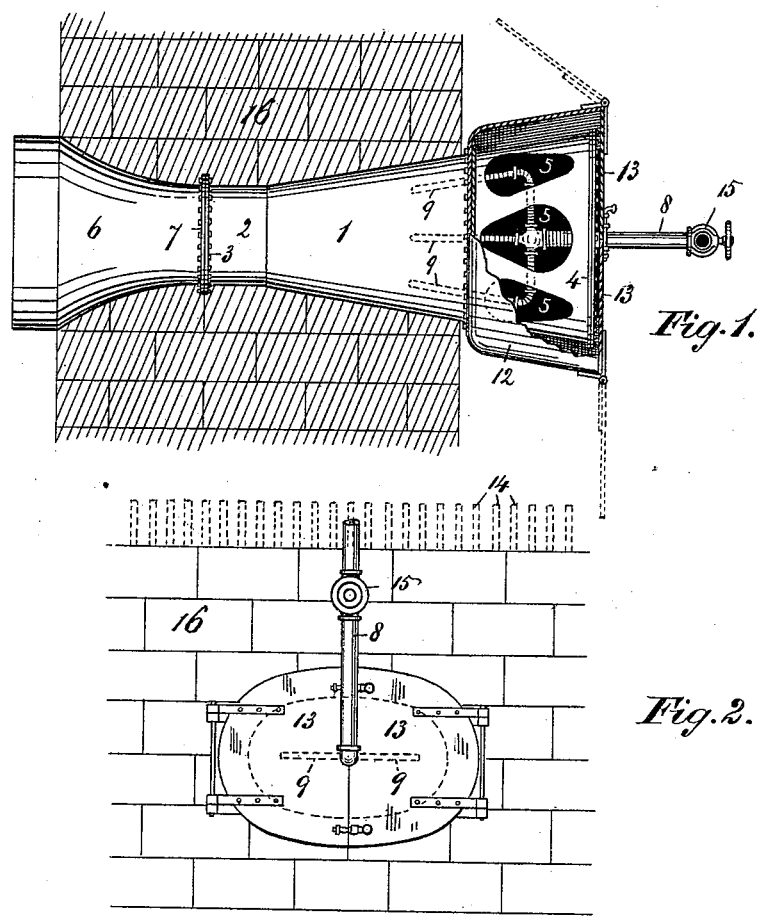

(No Model.)

S. R. EARLE.
STEAM AND AIR INJECTOR FOR FURNACES.

No. 447,563. Patented Mar. 3, 1891.

Witnesses:
John Grist
H. H. Horsey.

Inventor:
Salyer R. Earle
By Henry Grist
Attorney

UNITED STATES PATENT OFFICE.

SALYER REED EARLE, OF BELLEVILLE, CANADA.

STEAM AND AIR INJECTOR FOR FURNACES.

SPECIFICATION forming part of Letters Patent No. 447,563, dated March 3, 1891.

Application filed November 21, 1890. Serial No. 372,249. (No model.) Patented in Canada October 20, 1890, No. 35,254.

*To all whom it may concern:*

Be it known that I, SALYER REED EARLE, of the city of Belleville, in the county of Hastings, in the Province of Ontario, in the Dominion of Canada, have invented certain new and useful Improvements in Steam and Air Injectors for Furnaces, &c., (for which I have obtained a patent in Canada, No. 35,254, bearing date October 20, 1890;) and I do hereby declare that the following is a full, clear, and exact description of the same, reference being had to the accompanying drawings, in which—

Figure 1 is top view of my injector as applied to a block furnace, a portion of the hood broken away to show the air-inlets; and Fig. 2 is an end elevation of the same.

My invention has for its object to promote combustion and increase the draft of furnaces, &c., by injection of commingled steam and air into a furnace below the combustion-chamber; to lessen the noise caused by injection; to obtain a diversified distribution of steam and uniformity of draft through the air-inlets, and to close off direct draft through the air-inlets when slow combustion is desired.

My invention consists, in combination with a furnace, of an injector constructed as hereinafter set forth and claimed.

1 is a tapering section of an injecting-tube of round, oval, or elliptical form in cross-section, and having a straight portion or neck 2 at the smaller end, said neck having, preferably, an outward peripheral flange 3, to which is connected a flaring round, oval, or elliptical tubular discharge-section 6, having, preferably, a flange 7, which is bolted to flange 3 to allow the straight outlet 6 to be removed and an elbow-section having a flaring mouth substituted to adapt the injector to suit marine and locomotive boilers. The larger end of the tapering section 1 of the injecting-tube is closed by a cap 4.

5 is a series of perforations in the periphery of said section, near the larger end, to admit air into the injector.

The injector is preferably of oval or elliptical shape in cross-section throughout its length to obtain better distribution of the commingled air and steam, especially in furnaces of large size.

8 is a steam-pipe from a source of supply of steam, said pipe entering the tube through the closed end, and terminates within the tube in a series of branches 9, having a small orifice to discharge a small jet of steam into the injector longitudinally, and said branches extend past the series of perforations 5 and cause an induced current or indraft of air, which becomes incorporated with the steam to assist combustion while passing through the fuel. The noise caused by the discharge of a considerable jet of steam against the air in the injector is greatly moderated by smaller steam-jets more or less distributed.

12 is a bell-shaped hood surrounding the larger end of the tubular section 1 and peripherally incloses the series of air perforations. The open end of said hood projects beyond the larger end of the injector and is provided with doors 13, closing over the end cap 4, said hood, when the doors are closed, preventing direct indraft through the perforations 5, to economize fuel when the fire is banked or slow combustion desired after the steam-valve 15 in pipe 8 has been closed.

14 are the furnace-bars. The middle portion of the injector is embedded in the wall 16 of the furnace below said bars. The commingled steam and air discharged from the injector pass up between the furnace-bars and through the fuel to promote combustion.

The perforated portion of the injector projects from the outer face of the wall of the furnace to allow air to freely enter the perforations, and by embedding the middle portion of the injector in the wall of the furnace the noise of the steam and air passing through the injector is lessened, and an objectionable feature thereby removed.

I claim as my invention—

An injector having a tapering section 1, closed at the larger end and provided with a series of peripheral perforations 5, a hood 12, surrounding the larger end of said tube peripherally and provided with doors 13, inclosing said end, and a steam-pipe entering said closed end and through said doors, said hood and doors shutting off direct admission of air through the perforations when slow combustion is desired, as set forth.

SALYER REED EARLE.

Witnesses:
J. A. PHILLIPS,
E. ORMANDE.